United States Patent Office 3,784,507
Patented Jan. 8, 1974

3,784,507
STABILIZED POLYESTER FILM
David M. Braunstein, Edison, N.J., assignor to Celanese Corporation, New York, N.Y.
No Drawing. Filed Mar. 4, 1971, Ser. No. 121,157
Int. Cl. C08g 17/133, 51/58
U.S. Cl. 260—45.7 P    3 Claims

ABSTRACT OF THE DISCLOSURE

A process is disclosed and claimed employing a catalytic system of a manganous salt and antimony trioxide in combination with di(polyoxyethylene) hydroxymethyl phosphonate to produce polyester resins which exhibit improved thermal stability and embrittlement resistance in the resultant film. The thermally stable polyester films of this invention exhibit utility as films in xerography, tape recorders and the like.

---

This invention relates to the preparation of film forming polyalkylene terephthalates and more particularly to the film formed therefrom having improved thermal stability and embrittlement resistance.

More particularly this invention relates to an improvement in the preparation of film forming polyalkylene terephthalates( e.g., polyethylene terephthalate and the like) prepared by reacting a glycol with an alkyl ester of terephthalic acid so as to effect ester interchange and the resulting glycol terephthalate is thereafter polymerized under conditions to form the polyalkylene terephthalate, the improvement of conducting the process in the presence of a particular catalyst system of a manganous ion, an antimony ion and a stabilizing amount of di(polyoxyethylene) hydroxymethyl phosphonate.

The production of film forming polyalkylene terephthalates wherein a glycol of the series $HO(CH_2)_nOH$, wherein $n$ is an integer from 2 to 10 is reacted with an alkyl ester of terephthalic acid is well known in the art and is disclosed in U.S. Pat. No. 2,465,319 issued to Whinfield and Dickson.

Suitable glycols of the series $HO(CH_2)_nOH$, wherein $n$ is an integer from 2 to 10 include ethylene glycol, trimethylene glycol, tetramethylene glycol, hexamethylene glycol, decamethylene glycol and the like. Suitable alkyl esters of terephthalic acid are the terephthalate esters of saturated aliphatic monohydric alcohols containing up to and including four carbon atoms which include dimethyl terephthalate, diethyl terephthalate, dipropyl terephthalate and diisobutyl terephthalate.

In the production of the films forming polyalkylene terephthalates of this invention, monomeric bis(hydroxyalkyl) terephthalate is produced as the intermediate product. The monomeric bis(hydroxyalkyl) terephthalate is prepared by reacting one molecular proportion of the alkyl ester of terephthalic acid with about two molecular proportions of the glycol hereinbefore described. It is preferred to use higher proportions of the glycol, i.e., in excess of two molecular proportions of the glycol per molecular proportion of the alkyl ester of terephthalic acid, since by using such proportions, the initial transesterification is caused to take place more rapidly and completely.

The reaction for the transesterification is best conducted under conditions of elevated temperature and atmospheric pressures. It is understood that subatmospheric or superatmospheric pressures may be employed with a corresponding change in the reaction temperature. Normally, the desired temperatures of the reaction may range from about the boiling temperature of the reaction mixture to as high as about 250° C. During the course of the transesterification reaction, utilizing an alkyl ester of terephthalic acid as the starting material, the glycol reacts with the starting material to form bis(hydroxyalkyl) terephthalate and an alkanol by-product. As an illustration, the reaction of dimethyl terephthalate with ethylene glycol will produce bis(2-hydroxyethyl) terephthalate and methanol. It is highly desirable to remove the methanol content as it is formed in the reaction to assure a faster reaction and then further remove the unused ethylene glycol which is distilled from the transesterification product.

The bis(hydroxyalkyl) terephthalates produced by the process of this invention are converted into high molecular weight polymerized products by heating at a temperature above the boiling point of the corresponding glycol or reaction mixture under conditions effecting removal of the glycol or water and to temperatures as high as about 325° C. It is essential in obtaining the desired polymerized product that during the heating or during part of the heating, the pressure is reduced so as to provide rapid distillation of the excess of glycol or water. The pressure may be reduced in successive stages so that the heating begins at normal pressure, is continued at a reduced pressure and is completed at a further reduced pressure. Pressures in the range of from about 1 to 10 millimeters of mercury are preferred. The heating of the polymerization reaction is conducted under conditions to prevent oxidation, i.e., any presence of oxygen should be avoided, and a slow stream of an inert gas, for example, nitrogen, carbon dioxide and the like, can be passed through or over the molten mass. During the heating and polymerization, viscosity of the melt gradually increases; the temperature must be maintained high enough to keep the mass in the molten state during the entire heating period. The heating is continued until the melting point of the polymerized product exceeds about 240° C., preferably exceeding 250° C. After the heating is completed the product may be utilized to produce films or otherwise removed from the reaction vessel in molten form and formed into blocks, chips and the like for future use in a film forming operation.

After the high molecular weight synthetic linear polymer of this invention has been produced, the polymer is extruded on polished revolving casting drums and biaxially stretched, i.e., forward and lateral stretching in either order or simultaneously to impart strength and toughness to the film. The amount of stretching can range from about 1.3 to about 4.5 times the original dimensions and preferably from about 2.5 to 4.0 times the original dimensions. The stretching operation is carried out at temperatures in the range from about the second order transition temperature and below the temperature at which the polymer softens and melts. The method of forming the film can be carried out by the use of conventional tensilizing equipment and consistently produces a uniform product.

This invention relates the use of a particular catalyst system in combination with di(polyoxyethylene) hydroxymethyl phosphonate having the chemical formula,

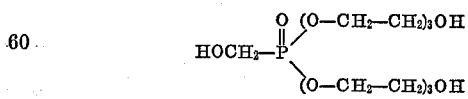

employed in the above disclosed process which produces a polyalkylene terephthalate polymer capable of forming a film of improved thermal stability and embrittlement resistance.

Although the bis (hydroxyalkyl) terephthalate, described above, may be produced without the use of a catalyst, it is highly desirable to utilize a catalyst to speed up the reaction. Of all the catalysts available for the transesterification reaction, I have found that manganous glycoloxide or manganous acetate are particularly effective in contributing to the unexpected results achieved in the instant invention. In spite of the fact that there are many catalysts that are known to assist in the transesterification reaction such as the alkali metals, alkaline earth metals, beryllium, boron, cadmium, cerium, chromium, cobalt, lanthanum, magnesium, titanium, zinc, and the like and the corresponding compounds of the above-described metals such as oxides, glycoloxides, carbonates, acyl derivatives and the like combinations thereof; manganous ions unexpectedly are quite effective in contributing to the unexpected heat stability property of the finished films.

In like manner there are many catalysts known for use in the polymerization of the bis(hydroxyalkyl) terephthalate such as antimony trioxide, triphenyl antimonite, triethyl antimonite, tris(2-hydroxyethyl) antimonite, antimonyl potassium tartrate, tetraisopropyl titanate, potassium titanate, lanthanium titanate, germanium dioxide, antimony triglycoloxide, antimony fluoride and the like. From this group of known polymerization catalysts, I have found that antimony trioxide and antimony triglycoloxide are particularly effective in combination with the di(polyoxyethylene) hydroxymethyl phosphonate and the manganous compounds in contributing to the surprising results of the instant invention.

Presently phosphorous acid is commonly used as a stabilizer in polyalkylene terephthalate film, however, for certain uses wherein exposure to high temperatures for long periods of time, e.g., in electrical applications, cassette tape and the like, embrittlement sets in causing a relatively quick failure. I have found that if a particular catalyst system is employed and di(polyoxyethylene) hydroxymethyl phosphonate is substituted for the phosphorous acid as a stabilizer, the resultant film exhibits high temperature stability.

It is beileved that di(polyoxyethylene) hydroxymethyl phosphonate, because of its hydroxy termination, actually ties into the polymer chain. It is also believed that the residual manganous ion, which is commonly the chief cause for heat instability, reacts with the phosphorous segment in the phosphate and consequently the manganous is retained in the actual polymer, but in a stabilized form.

The manganous compounds are present in amounts of from about 0.01 to about 0.20 weight percent and preferably from about 0.05 to about 0.10 weight percent. The antimony compounds are present in amounts of from about 0.01 to about 0.10 weight percent and preferably from about 0.02 to about 0.05 weight percent. The di(polyoxyethylene) hydroxymethyl phosphonate is present in amounts of from about 0.01 to about 0.2 weight percent and preferably from about 0.10 to about 0.15 weight percent. All weight percents are based upon the weight of the alkyl ester of terephthalic acid. It is, of course, understood that smaller amounts of the various additives and catalysts may be employed than that set forth above, however, slower reaction rates and decreased stabilization will result. Correspondingly, higher amounts may be employed than those set forth above but little, if any, increase in reaction rates and/or stabilization will occur.

The components may be initmately admixed and added to the reaction mixture prior to the transesterification step or they may be added individually to reaction mixture, so long as the manganous compound is added prior to the transesterification step and the antimony compound is added prior to the polymerization step. The di(polyoxyethylene)hydroxymethyl phosphonate may be added 100 percent pure to the reaction mixture, however, it is preferable to add the phosphonate as part of a slurry of a constituency of up to about 100 percent with water, ethylene glycol and the like. The di(polyoxyethylene) hydroxymethyl phosphonate solution may be added prior to the transesterification, immediately after the transesterification and during the polymerization (up until about 10 percent completion), but preferably after the transesterification step.

The following examples are illustrative of the present invention and are not intended to limit the same in any manner.

EXAMPLES I–IV

Dimethyl terephthalate and ethylene glycol in the amounts indicated in Table I were added to a two liter stainless steel reaction kettle fitted with a mechanical stirrer, glass helice packed fractionation column, thermometer and gas inlet valve. Heat was supplied and stirring was commenced. After thirty minutes the temperature in the reaction kettle was 110° C. and a catalyst mixture was added to the reaction mixture. When the temperature reached approximately 155° C., methanol began to distill off. After the transesterification was complete (measured by the amount of methanol collected), the distillation column was replaced by a vacuum condenser fitted with a one liter round bottom flask immersed in Dry Ice-methanol for collection of ethylene glycol. The pressure in the reaction kettle was then decreased at such a rate that the ethylene glycol distilled at almost a pouring rate. Di(polyoxyethylene) hydroxymethyl phosphonate was added, in the amounts indicated in Table I, when the polycondensation was approximately ten percent complete by means of a hypodermic syringe. The kettle temperature reached 280° C. in about 30 minutes and after 10 minutes the systme was on full vacuum (1.5 millimeters of mercury) and the heat cut back. The temperature of the kettle was maintained between 275° C. and 285° C. for two hours. The polymer was quenched in water after being forced out of the bottom of the reaction kettle by means of nitrogen gas. The resin was subsequently extruded in the form of film, bioriented 3.5 x 3.5 simultaneously and crystallized at 220° C. The films were subsequently aged in a forced air circulating oven at 195° C.±2.0° C. At designated intervals, the film samples were checked for embrittlement by means of a fold test. The fold test consisted of hand folding and creasing the film sample in several places and noting if the film sample cracked along the crease.

TABLE I

| | Grams | | | | Intrinsic viscosity | DEG[e] | CEG[f] | Embrittlement time (days) |
|---|---|---|---|---|---|---|---|---|
| | DMT | EG | Catalyst | Calatyst | Stabilizer | | | | |
| Example: | | | | | | | | | |
| I | 1,358 | 955.5 | [a] 0.572 | [b] 0.385 | [c] 1.60 | [d] 0.581 | 1.2 | 11 | 59 |
| II | 1,358 | 955.5 | [a] 0.572 | [b] 0.385 | [c] 1.60 | 0.526 | 1.2 | 10 | 56 |
| III | 1,400 | 984 | [a] 0.572 | [b] 0.385 | [g] 0.70 | 0.590 | 2.5 | 43 | 11 |
| IV | 1,400 | 984 | [a] 0.572 | [b] 0.385 | | 0.786 | 1.6 | 56 | 4 |

[a] $Mn(OAc)_2 \cdot 2\tfrac{1}{2}H_2O$.
[b] $Sb_2O_3$.
[c] Di(polyoxyethylene) hydroxymethyl phosphonate.
[d] Dl./grams.
[e] Diethylene gylcol measured in mole percent.
[f] Carboxy end group measured in equivalent per $10^6$ grams.
[g] Phosphorous acid.

Equivalent results are obtained when manganous glycol oxide is substituted in equal amounts for manganous acetate and when antimony triglycoloxide is substituted for antimony trioxide.

The principle, preferred embodiment, and mode of operation of the present invention have been described in the foregoing specification. However, it should be understood that the invention which is intended to be protected herein, may be practiced otherwise than as described without departing from the scope of the appended claims.

What is claimed is:

1. In a process for manufacturing film forming polyalkylene terephthalates, said alkylene moiety containing from 2 to 4 carbon atoms, wherein a glycol of the formula $HO(CH_2)_nOH$, where $n$ is an integer from 2 to 4, is reacted with an alkyl ester of terephthalic acid, wherein said alkyl moiety contains from 1 to 4 carbon atoms, under conditions to effect ester interchange, and the resulting glycol terephthalate is thereafter polymerized under conditions to form polyalkylene terephthalates, the improvement which comprises catalyzing said ester interchange with a compound selected from the group consisting of manganous acetate and manganous glycol oxide, catalyzing said polymerization reaction with a compound selected from the group consisting of antimony trioxide and antimony triglycoloxide, and conducting said overall process in the presence of a stabilizing amount of di(polyoxyethylene) hydroxymethyl phosphonate, wherein said film has improved thermal stability and embrittlement resistance.

2. The process of claim 1 wherein said di(polyoxyethylene) hydroxymethyl phosphonate is present in the reaction mixture in 0.01 to about 0.2 weight percent.

3. The process of claim 2 wherein said polyalkylene terephthalate is polyethylene terephthalate.

References Cited

UNITED STATES PATENTS

| 2,841,604 | 7/1958  | Fon Toy et al.   | 260—961 |
|-----------|---------|------------------|---------|
| 2,934,507 | 4/1960  | Chadwick et al.  | 260—23  |
| 3,214,396 | 10/1965 | Schoepfle et al. | 260—2.5 |
| 3,406,153 | 10/1968 | Eaton et al.     | 260—75  |
| 3,489,722 | 1/1970  | Kotani et al.    | 260—75  |
| 3,092,651 | 6/1963  | Friedman         | 260—953 |
| 3,525,711 | 8/1970  | Jenkner          | 260—47  |
| 3,028,366 | 4/1962  | Engle, Jr. et al.| 260—75  |
| 3,376,258 | 4/1968  | Gysling et al.   | 260—47  |
| 3,446,763 | 5/1969  | Okuzumi          | 260—22  |

DONALD E. CZAJA, Primary Examiner

R. A. WHITE, Assistant Examiner

U.S. Cl. X.R.

260—75 P